(12) United States Patent
Sawyer (10) Patent No.: US 7,735,076 B2
(45) Date of Patent: Jun. 8, 2010

(54) FASTER LOADING OF EXTENSION-BASED APPLICATIONS USING CACHING

(75) Inventor: David G. Sawyer, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1202 days.

(21) Appl. No.: 10/966,951

(22) Filed: Oct. 15, 2004

(65) Prior Publication Data

US 2006/0085439 A1    Apr. 20, 2006

(51) Int. Cl.
G06F 9/44    (2006.01)

(52) U.S. Cl. .......................... 717/168; 717/162; 713/2; 719/331

(58) Field of Classification Search ................. 717/107, 717/168–178; 713/1, 2
See application file for complete search history.

(56) References Cited

U.S. PATENT DOCUMENTS

| | | | |
|---|---|---|---|
| 5,247,681 A | | 9/1993 | Janis et al. |
| 5,416,890 A | * | 5/1995 | Beretta ........................ 345/590 |
| 5,504,892 A | * | 4/1996 | Atsatt et al. ............. 707/103 R |
| 5,914,714 A | | 6/1999 | Brown |
| 5,974,549 A | | 10/1999 | Golan |
| 6,006,279 A | | 12/1999 | Hayes |
| 6,085,120 A | | 7/2000 | Schwerdtfeger et al. |
| 6,807,630 B2 | * | 10/2004 | Lay et al. ........................ 713/2 |
| 6,996,832 B2 | | 2/2006 | Gunduc et al. |
| 7,107,548 B2 | | 9/2006 | Shafron |
| 7,117,507 B2 | * | 10/2006 | Hostetter et al. ............ 719/331 |
| 7,509,638 B2 | * | 3/2009 | Backhouse et al. .......... 717/177 |
| 2002/0169949 A1 | * | 11/2002 | Shenassa et al. ............... 713/1 |
| 2004/0073782 A1 | * | 4/2004 | Price et al. ...................... 713/1 |

OTHER PUBLICATIONS

Clarke et al. "An Architecture for DYnamically Extensible Operating Systems." 1998. Distributed Multimedia Research Group, Department of Computing, Lancaster University.*
Hudson et al. "Supporting Dynamic Downloadable Appearances in an Extensible User Interface Toolkit." 1997. ACM.*

(Continued)

*Primary Examiner*—Lewis A Bullock, Jr.
*Assistant Examiner*—Jue Wang
(74) *Attorney, Agent, or Firm*—Robert C Kowert; Meyertons, Hood, Kivlin, Kowert & Goetzel, P.C.

(57) ABSTRACT

Disclosed herein are methods for efficient loading of extensions or "plug ins" into a host software program. In a preferred embodiment, extensions registered with the host software program are loaded when the host program is first initialized. During their loading, changes that the various extensions make to the host program are recorded in a cache file, including graphical changes to the user interface and non-graphical changes. Later, when the host program is again initialized, the cache file is read in lieu of loading the extensions, with the affect that it appears to the user that the extensions' functionality are fully present in the host application, although in reality the extensions are not yet loaded. Instead, the extensions are loaded when and if they are called, either by the user or automatically by the computer. This saves time upon host program initialization as the extensions, once cached, need not be loaded until they are called.

27 Claims, 6 Drawing Sheets

OTHER PUBLICATIONS

Pardyak et al. "Dynamic Binding for an Extensible System." 1996. Proceedings of the Second Symposium on Operating Systems Design and Implementation.*

Glozic et al. "How to Keep Up to Date", Aug. 2003, Eclipse Corner Article, retrieved from: http://www.eclipse.org/articles/article.php?file=Article-Update/index.html.*

Chatley et al. "Predictable Dynamic Plugin Systems", Mar. 2004, FASE 2004, LNCS 2984, pp. 129-143.*

Arthorne et al., "Official Eclipse 3.0 FAQs", Jun. 2004, Addison Wesley Professional, FAQs: 69, 70, 71, 96, 101, 243.*

Microsoft, Microsoft Computer Dictionary, Fifth Edition, May 2002, Microsoft Press, definition of file.*

Catherine Griffin, "Introduction to Eclipse and the Eclipse Modeling Framework", May 2004, MDA Implementer's Workshop.*

Ruup, "David Rupp's Blog: IBM Web Tools Platform for Eclipse", Sep. 2004, Java.net.*

* cited by examiner

FASTER LOADING OF EXTENSION-BASED APPLICATIONS USING CACHING

FIELD OF THE INVENTION

This invention relates in general to computer software, and specifically to methods for efficient loading of extensions or "plug ins" into a host software program.

BACKGROUND

Application programs such as Adobe Acrobat™, Adobe Photoshop™, Microsoft Internet Explorer™, Microsoft Word™, etc., can be supplemented by third party software producers through the inclusion of application "extensions." Such application extensions "extend" the functionality of the host program by adding third party software functionality to the host program, or optionally may override certain functionality in the host program. Sometimes, such extensions are referred to in the art as "plug ins."

Figure 1:
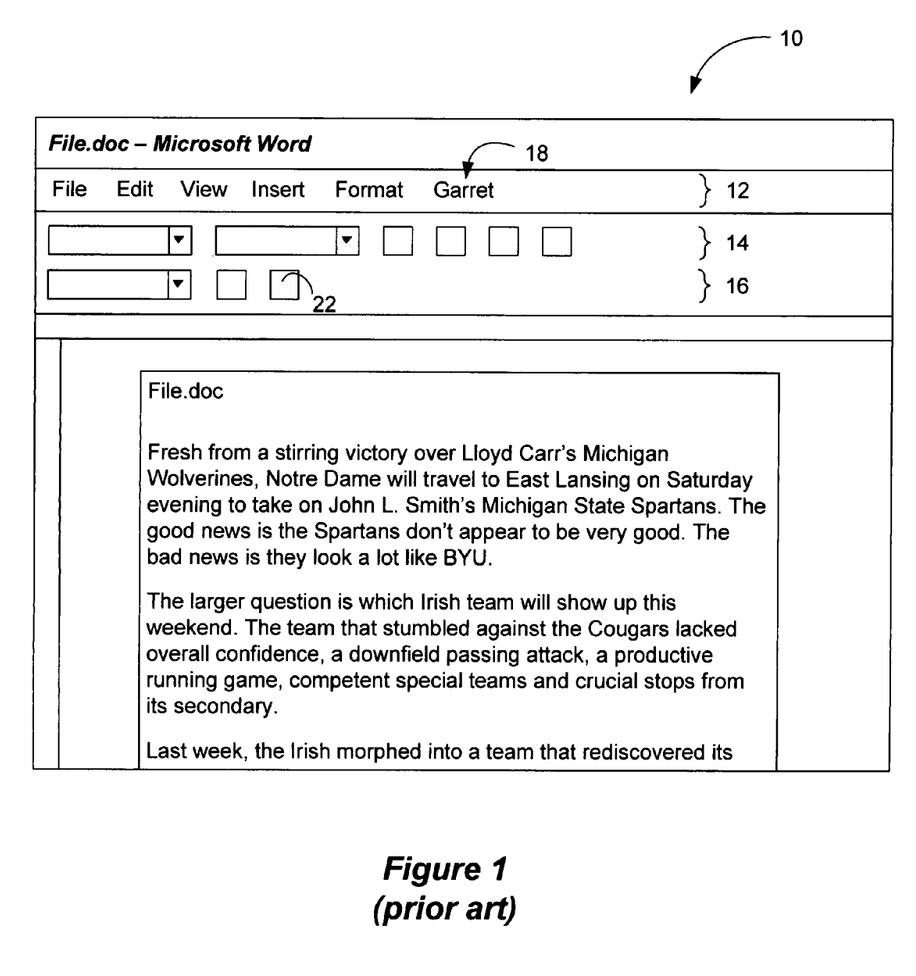
FIG. 1 illustrates a prior art graphical user interface of a host program (Microsoft Word™) and the effect of extensions on the user interface from an extension program (Garret).

For example, as shown in FIG. 1, a screen shot of the graphical user interface 10 of Microsoft Word is shown. In this example, Microsoft Word, the hosting program, has been extended to include functionality from a third party software product called "Garret." Accordingly, certain functional aspects of the Garret program have been made available within Word as the hosting program, which can occur in any number of ways. For example, the Garret application extension can cause a "Garret" drop-down menu 18 to be displayed as a modification to Word's standard menu bar 12. Although not shown, this drop-down menu 18 would allow the user to access the loaded functionality from the Garret extension (or extensions). Alternatively, menu options specific to the loaded Garret extension may appear as selections within the standard menu options already present on the standard menu bar 12 without the need for a separate Garret drop-down menu 18, although this is not shown.

Additionally, the loaded extension may cause a "Garret" tool bar 16 to appear in the user interface 10, providing buttons or drop-down windows to again allow the user to access the loaded functionality provided by the extension(s). Such extension buttons may be separate from or integrated with the standard tool bar 14 otherwise provided by Word as the hosting program. Of course, these manners of modifying the user interface of the hosting program by the extensions are merely exemplary. Alternatively, some of the aspects of the loaded extensions may not be visible to the user and/or may not cause modification of the graphical user interface 10.

For extensions to operate in this fashion, the hosting program must include an Application Programming Interface (API) to allow the extensions to register with the host program. After being registered, the registered extensions are loaded when the host program is initialized, e.g., when the user runs the host program or when the host program is otherwise made to run automatically. In short, when the host program is initialized, the extensions too are loaded and initialized. But the additional computer resources required to load the registered extensions can make initializing the host program slow. For example, in the example shown in FIG. 1, when Word is initialized, the registered extensions may require queries to certain files or code fragments within the Garret program, and these files or code fragments may be scattered elsewhere on the computer's hard drive, i.e., wherever the Garret program is ultimately stored. Of course, the additional time taken to initialize the Word program is further lengthened if there are several registered extensions for a given program (such as "Garret"), and/or if extensions from many different third party software programs are used. At some point, this additional time becomes unsatisfactory to the user, who generally will not wish to wait more than a few seconds for the host program to initialize.

Further compounding this problem is the fact that all registered extensions are typically loaded regardless of whether they will be used. For example, suppose a Garret extension 22 (in this case, a button) provides certain additional functionality to the Word program, e.g., by providing an additional spell checking feature. It may be the case that the user never wishes to access this additional spell checking feature (perhaps because the user is comfortable using the spell checking feature already provided by Word), or that the user will use this feature only occasionally (e.g., one time out of every twenty times the user runs the Word program). In such cases, using processing resources (and time) to load the Garret extension for the spell checking feature is generally wasteful. Again, the overall problem is compounded when one realizes that a particular hosting program might potentially have hundreds of extensions that are registered to it, of which some will never (or only occasionally) be selected by the user or automatically by the host program.

Figure 2:
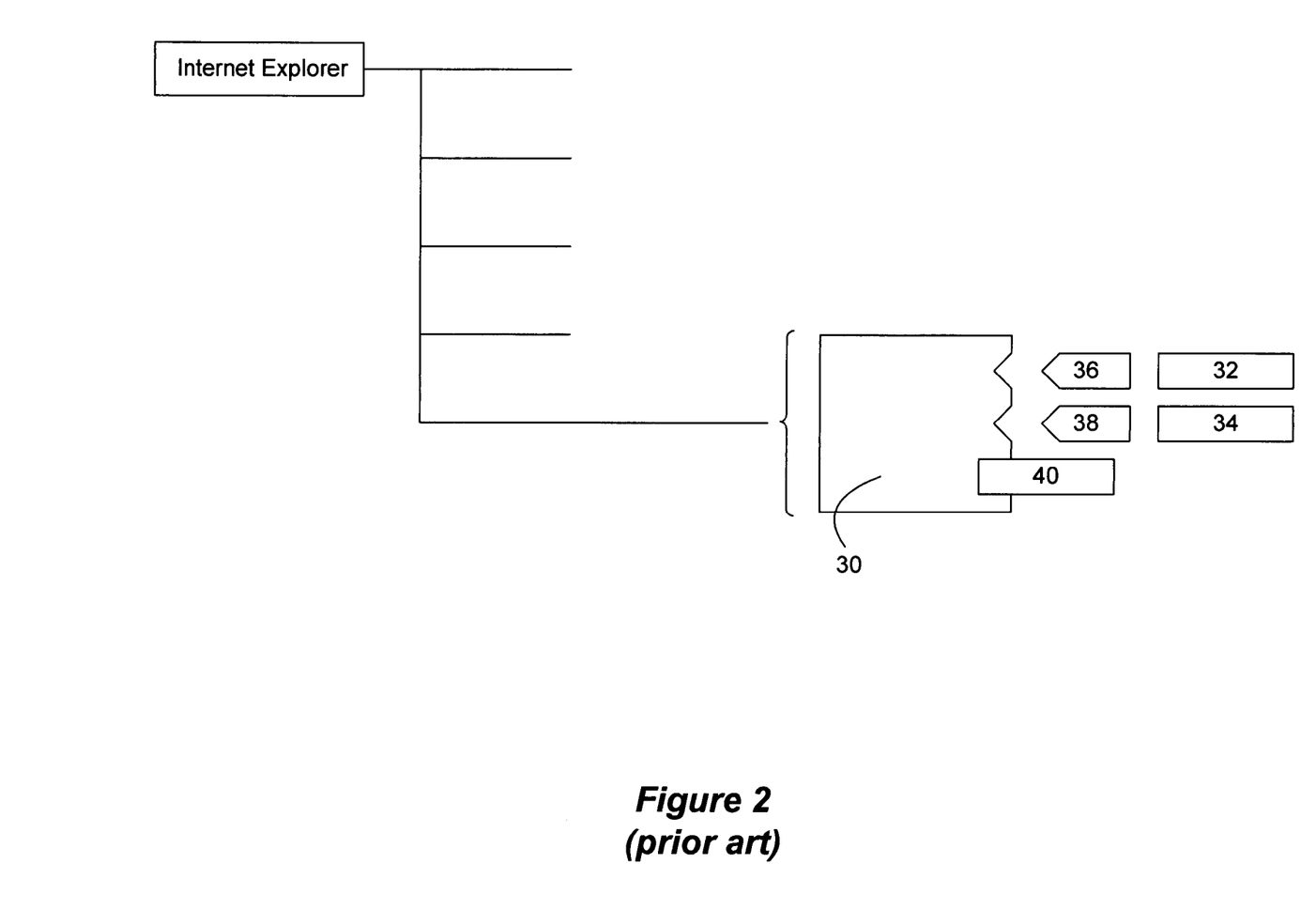
FIG. 2 illustrates prior art, specifically Microsoft Internet Explorer™ (IE), and the mechanism by which extensions can register with IE through the use of keys to facilitate efficient loading of the extensions.

One solution to this problem is to simply not allow the extensions to load, or to load them at a time when the functionality that the extension provides is selected or called. For example, in Microsoft's Internet Explorer (IE) program, and as shown in FIG. 2, a registry directory 30 is provided by which extensions can register themselves with IE as the host program. Specifically, the extensions 32, 34 are preferably (from IE's point of view) accompanied by registry keys 36, 38 in the registry directory 30. The registry keys 36, 38 can constitute pointers to where the extensions, and certain specific information concerning the extensions, are stored. Thus, when IE initializes, it reviews the registry keys 36, 38, and gathers (for example) bit maps from the extensions relating to changes in the graphical user interface that the extensions would have IE make. For example, if extension 32 would have IE place a button (such as 22) on a tool bar, the bit map for that button would be fetched as specified by the key 36. Thus, when IE initializes, it in theory is able to merely consult the keys 36, 38, gather the appropriate minimal information from the extensions, and make necessary changes to the user interface so that it appears to the user that the extensions 32, 34 have been fully loaded. However, the extension is not in fact loaded at this time, but instead is fully loaded when and if the functionality pertaining to that extension is called (such as by selecting button 22). Accordingly, this scheme potentially allows the extensions to be loaded only when and if they are engaged, saving time during the initialization of the host program.

But there are drawbacks to this approach. First, as just mentioned, the host program (i.e., IE) would potentially need to load or read a number of pieces of data (e.g., the bit maps) from the extensions programs upon initialization as specified by the keys 36, 38. As these pieces of data would reside with the extension programs, they would be randomly scattered throughout the computer's hard drive, thus requiring at least some processing and time to retrieve them upon the host program's initialization. Second, by virtue of this approach, the host program shifts responsibility to the extension programmers to write their extensions 32, 34 (or at least their keys 36, 38) in a manner specified by the host program to allow for efficient processing of the type set forth above. This requires the extension programmers to have knowledge of the host program's desired formats for registration, which they may not have even if such optional formatting schemes are made public as part of the API. Moreover, extension program writers may lack incentive to code their extensions in this way, which results in yet a third drawback: despite IE's permitted acceptance of register keys 36, 38 to help facilitate loading of the extension, the fact remains that IE does not require the use of register keys, i.e., does not require the registering extension to partake of time-saving extension-loading key-based scheme discussed above. Thus, as illustrated by extension 40 in FIG. 2, an extension can fail to provide a key to IE's registry domain 30, and instead can merely provide the extension to the registry domain, thereby causing the extension to fully load when the host program is initialized. Should all extensions decide not to use the host program's registration format, all benefits of the scheme are lost. Fourth, once a registry key format has been set by the host program to allow for efficient extension loading, that format must thereafter continue to be supported by the host program, or extension programs relying on that format will not be recognized. Fifth, this scheme provides a solution for only the simplest user interface additions. It does not address non-user interface additions, deletions, or modifications, nor user interface modifications or additions. Thus many extensions may not use such a scheme.

Accordingly, the software art would be benefited by a better solution to the problem of efficient initialization of a host program to which extensions have been registered.

SUMMARY

Disclosed herein are methods for efficient loading of extensions or "plug ins" into a host software program. In a preferred embodiment, extensions registered with the host software program are loaded when the host program is first initialized. During their loading, changes that the various extensions make to the host program are recorded in a cache file, including changes to the graphical user interface and non-graphical changes. Later, when the host program is again initialized, the cache file is read in lieu of loading the extensions, with the effect that it appears to the user that the extensions' functionality are fully present in the host application, although in reality the extensions are not yet loaded. Instead, the extensions are loaded when and if they are called, either by the user or automatically by the host program. This saves time upon host program initialization as the extensions, once cached, need not be loaded until they are called. Use of the disclosed technique does not require the extensions to be coded or registered in any particular format.

The disclosed cache file preferably comprises earlier recorded data, which the host program reads upon subsequent initializations of the host program. The data preferably comprises all that is necessary to make the host program appear to the user as if all extensions have been fully loaded, and provides sufficient information to generate "proxy code" for each extension which can be run when and if the cached extension is called for loading. Thus, for extensions that modify graphics, the data in the cache file preferably contains a bit map of the required information as well as the information needed to find and load the associated extension. For non-graphical changes, the cache file data may comprise a pointer to the extension code or to that extension's registration in the registry directory, i.e., what is necessary to find and load the extensions.

BRIEF DESCRIPTION OF THE DRAWINGS

Embodiments of the inventive aspects of this disclosure will be best understood with reference to the following detailed description, when read in conjunction with the accompanying drawings, in which.

DETAILED DESCRIPTION

Figure 3:
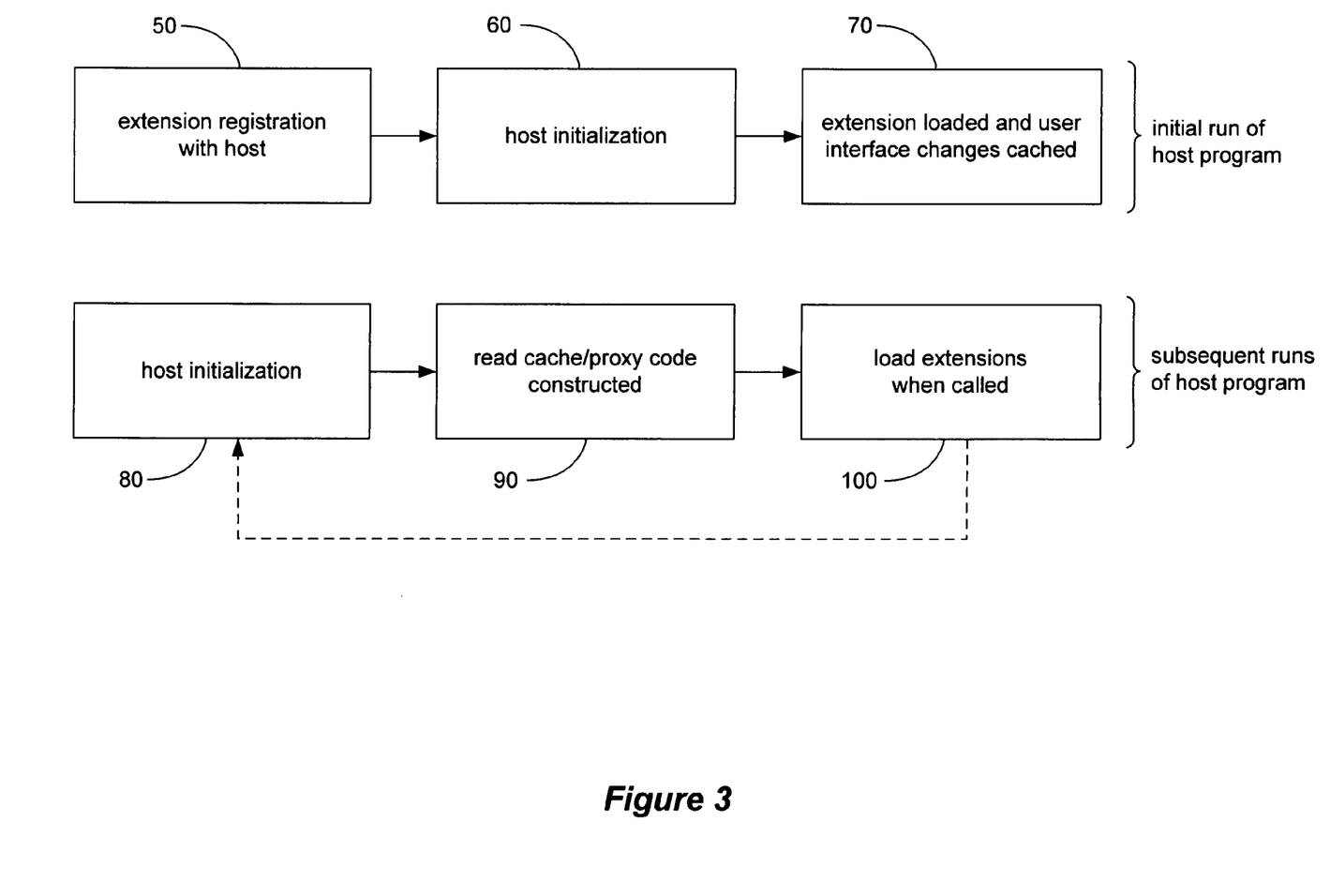
FIG. 3 illustrates a flow chart of an embodiment of the disclosed technique for processing and loading extensions into a host program.

FIG. 3 illustrates the basic flow of the disclosed solution for addressing the problem of extension loading during host program initialization. The process staffs by allowing the extensions to register with the host program (50) using any registration technique such as those well known to those skilled in the art. Such registration step preferably does not require the use of registration keys (e.g., 36, 38 in FIG. 2), but rather allows the extension to register by merely informing the host application of the extension.

Next, the host program initializes (i.e., is run) (60), and the extensions are allowed, at least initially, to fully load (70). As one skilled in the art will recognize, such loading of extensions generally occurs rather early in the initialization of the host program, for example, before the display of graphics on the user interface. This is logical, as it allows the extensions to load and perhaps modify the graphics of host program before they are displayed in substantial detail to the user. Moreover, as one skilled in the art will appreciate, the loading of the extensions occurs during a set period in the host application's launch sequence.

During loading of the extensions during this period (70), the loading process is monitored by the host application, and those aspects working a change to the host program (whether graphical or not) are recorded and stored in a cache file 150. While this cache file 150 will be explained in more detail later, the cache file 150 essentially represents the changes that the extensions work to the host program. For example, if a particular extension will add a button (such as 22, FIG. 1) to the user interface of the host program, the cache file 150 will record the textual/graphical/location information for that button being displayed. In another example not constituting a graphic-based change, if a particular extension will add a new or different random number generator to the host program, the location of the new random number generator extension (i.e., where it is located on the user's hard disk) is cached, as is explained further below. Thus, during the recording and cache generation process (70), the extensions themselves are not cached; rather only the changes the extensions render to the user interface and/or any other information relevant to how the host program will be changed are cached.

When the host program is subsequently initialized again (80), the cache file 150 is first checked to see if any new extensions not previously cached have been registered with the host program, or whether any extensions previously cached have been deregistered with the host program. (More on this later). Assuming no newly added or deleted extensions, the extensions this time are not loaded, and instead the cache file 150 is read, "proxy code" 200 is constructed (explained further below), and the host program is modified accordingly (90). As the cache file 150 contains all information relevant to changes in the host program (whether graphical or non-graphical) as previously recorded, the host program presents to the user what appears to be the host program as modified by the extensions, even though the extensions are not fully loaded nor ready for execution at this stage. Thus for example, the user would see the cached toolbar button (22, FIG. 1) displayed, and non-graphical changes would have the necessary pointers in place (although not apparent to the user).

Thereafter, should the functionality of a particular extension be called by the user (e.g., by selecting button 22), or automatically by the host program itself, that extension is then loaded using the proxy code for the extension, which in turn executes the extension's functionality (100). The proxy code may be able to completely remove itself so that subsequent invocations of functionality directly call the now-loaded extension, as explained below.

While the user must therefore wait for the registered extensions to fully load the first time the host program is initialized, thereafter only the cache file 150 needs to be read to make the application appear fully functional. Because the cache file 150 is preferably a single file (although perhaps a file in subparts as explained later) and located at a single region on the user's hard drive, it will load relatively quickly, and substantially more quickly than the loading of each extension. Then, when and if a particular extension is called, it can be fully loaded, thereby pushing the wait for such a load from the host program's initialization to the more reasonable time when the extension is first used. Moreover, and as noted earlier, the extensions require no special coding or formatting to render them compatible with this caching scheme.

Figure 4:
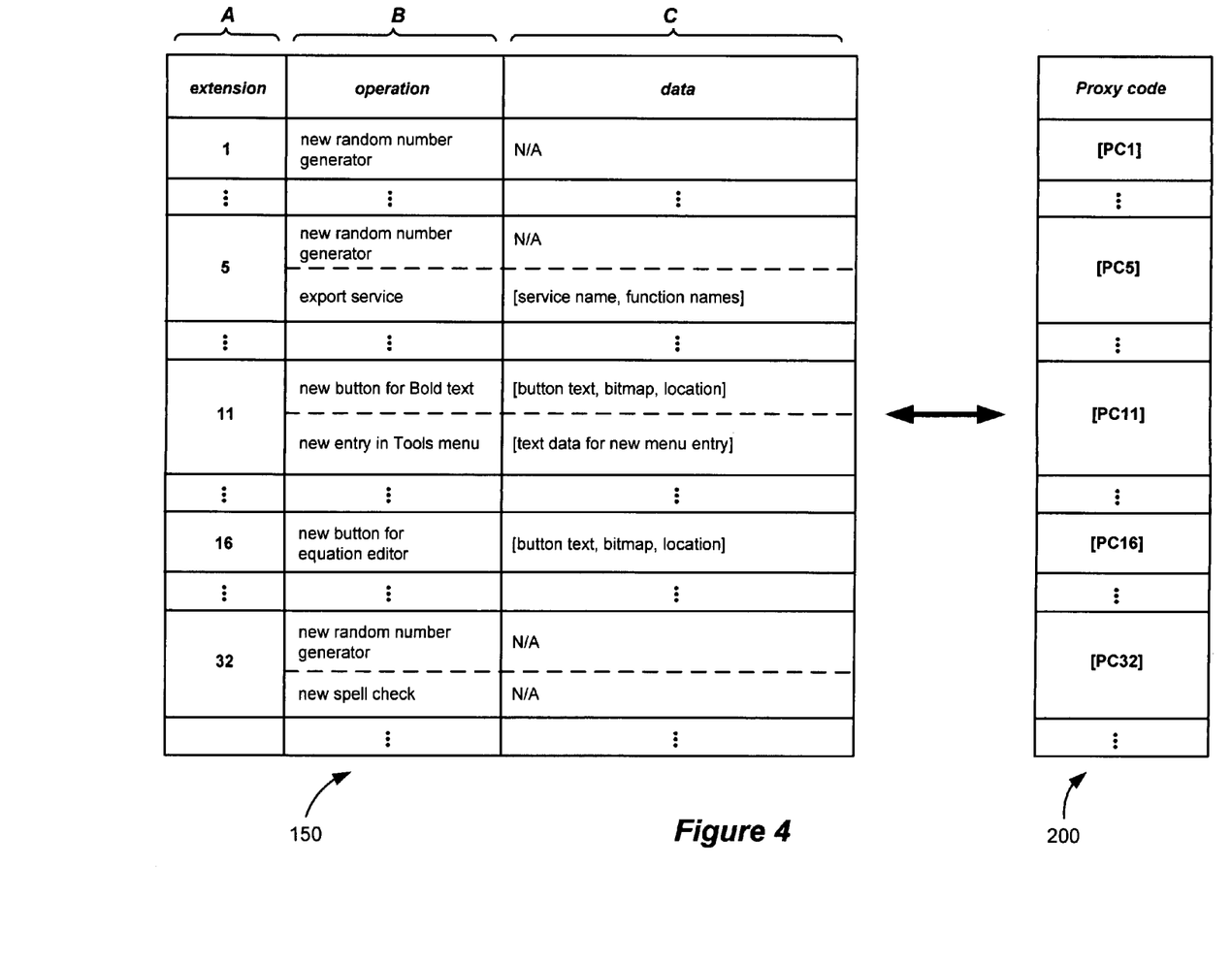
FIG. 4 illustrates an embodiment of a cache file generated by the disclosed technique.

With the above serving as an overview of the disclosed technique, further implementation details for the disclosed method are discussed, starting with FIG. 4, which illustrates a representation of an exemplary cache file 150. While the cache file 150 is preferably formatted as a single file, it can also be considered for illustrative purposes as a table having rows for each extension, and columns (A-C) comprising data pertinent to that extension.

Central to the cache file 150 is the recorded data (column C) for each extension. As noted earlier, the data in the cache file will vary depending on the type of extension at issue, and preferably varies if the extension works a graphical change or a non-graphical change to the user interface for the application. For a graphical change, the data would contain in significant part the graphical data for the change to be made to the user interface, which may constitute the text for the button, a bit map for the button, and its location on the graphical user interface or on some other structure such as a toolbar (see, e.g., Extensions #11, 16). Of course, these cached attributes are merely exemplary, and other information can be cached depending on the circumstances. For example, the extension might desire a button to be displayed only when a document is opened in the host program or only when text is selected; such information is also stored in the cache file 150 so that the button looks and behaves correctly even when the extension hasn't been loaded. In other embodiments, a pointer to the graphical data (i.e., in the original extension program) can be included with or used in lieu of the captured graphical data in column C, but this is less preferred as this would involve an intermediate step for displaying the graphical data and hence slow loading of the cache file. For a non-graphical change, the data in the cache file would preferably constitute a pointer to where the code for the extension can be found (e.g., Extension #1, 5, and 32), as is explained further below. In any event, the cache file 150 provides the host program what it needs to make it appear as if all extensions have been fully loaded. Additionally, the cache file 150 data's is preferably also sufficient to generate "proxy code" 200 for each extension, as will be explained in more detail later.

Also shown in FIG. 4 is the association between the data in the cache file 150 and the extension to which it relates (column A), as it is registered in the registry. This entry essentially constitutes a pointer to the extension. Thus, entry "1" for Extension #1 points to the first extension in the registry directory. For ease of illustration, the extensions are numbered in the order in which they would normally be expected to load, although this is not strictly required (e.g., Extension #19 might actually load as the third extension, i.e., Extension #19 would be listed in the third row of the cache file 150). Because this registry entry in turn points to the actual extension (i.e., where it exists on the hard drive), the entry "1" in effect constitutes a cached pointer and ultimately points to where the extension resides through the registry directory as an intermediary. For non-graphical user interface changes (such as the random number generator example discussed above), such caching of the pointer may be all the "data" that is required. Of course, in alternative embodiments, a specific pointer directly to the extension on the hard disk (as opposed to the registry directory) could also be cached as data in Column C, which might serve to eliminate the need to point to the registry directory as an intermediary step. However, directly caching the pointer as data is less preferred because the registry information for the extension already contains a pointer to the extension, and hence caching that as data would be somewhat redundant. Although the data in column C may be blank (N/A) for such non-graphical user interface changes, for simplicity, data (i.e., the pointer) is still said to be cached by virtue of the extension number in column A. In any event, the association between the cached data and the extension as reflected in column A is important in preferred aspects of the disclosed technique, because eventually the extension only pseudo-loaded via the cache file 150 may need to be loaded in earnest when and if the extension is called.

Column B, reflecting the basic operation of a given extension, reflects the routine in the host program that is to be changed, modified, or added, which again can be recorded upon the first initialization of the host program. Knowing this is also important in practice of the disclosed technique, for example, to ensure that the extensions will not conflict, as described in further detail below. Of course, the data formats of the cache file 150 in FIG. 4 are merely exemplary and are described in functional terms to aid in their understanding. As one skilled in the art will understand, the actual coding and data structures in the cache file 150 could be represented in any number of ways.

FIG. 4 further illustrates that a particular extension can work more than a singular change to the host program. For example, Extension #11 works a change to a toolbar button which allows the user to select a "Bold Text" function, and additionally adds a new textual entry in the "Tools" menu. Extension #32 likewise works two changes, although these are both non-graphical in nature (adjustments to the host program's spell check and random number generator routines). Of course, an extension can work both graphical and non-graphical changes. Additionally, an extension (e.g., Extension #5) can comprise a service which provides functionality to the host program or other applications or extension if they wish to receive the same and know of the service's existence.

Different extensions may seek to modify the same routines within the host program. Thus, extensions #1, 5, and 32 for example all provide a new random number generator routine to the host program. Ways in which the disclosed technique addresses these special considerations is addressed later.

Once the cache file 150 has been generated, it is queried and loaded in lieu of loading of the extensions when the host program is subsequently initialized as noted earlier, thus allowing the host program to initialize more quickly (90, FIG. 3). The cache file 150 still remains important however even after loading because in preferred embodiment it can continue to operate as "map" or "key" for associating the entries in the cache file to their extensions and to the routines in the host program that the extensions seek to modify.

When a particular extension is called for loading (e.g., when a pseudo-loaded button is selected), "proxy code" 200 is preferably used as a means for loading the extension, and in a sense such code operates as an intermediary between the extensions as they are pseudo-loaded (using the cache file) and the actual extensions themselves. Such proxy code 200 for each extension is constructed using the data in the cache file 150, including the various associations between the actual extension itself (column A) and the affected host program routine (column B). The proxy code is preferably generated when the cache file 150 is read.

Figure 5:
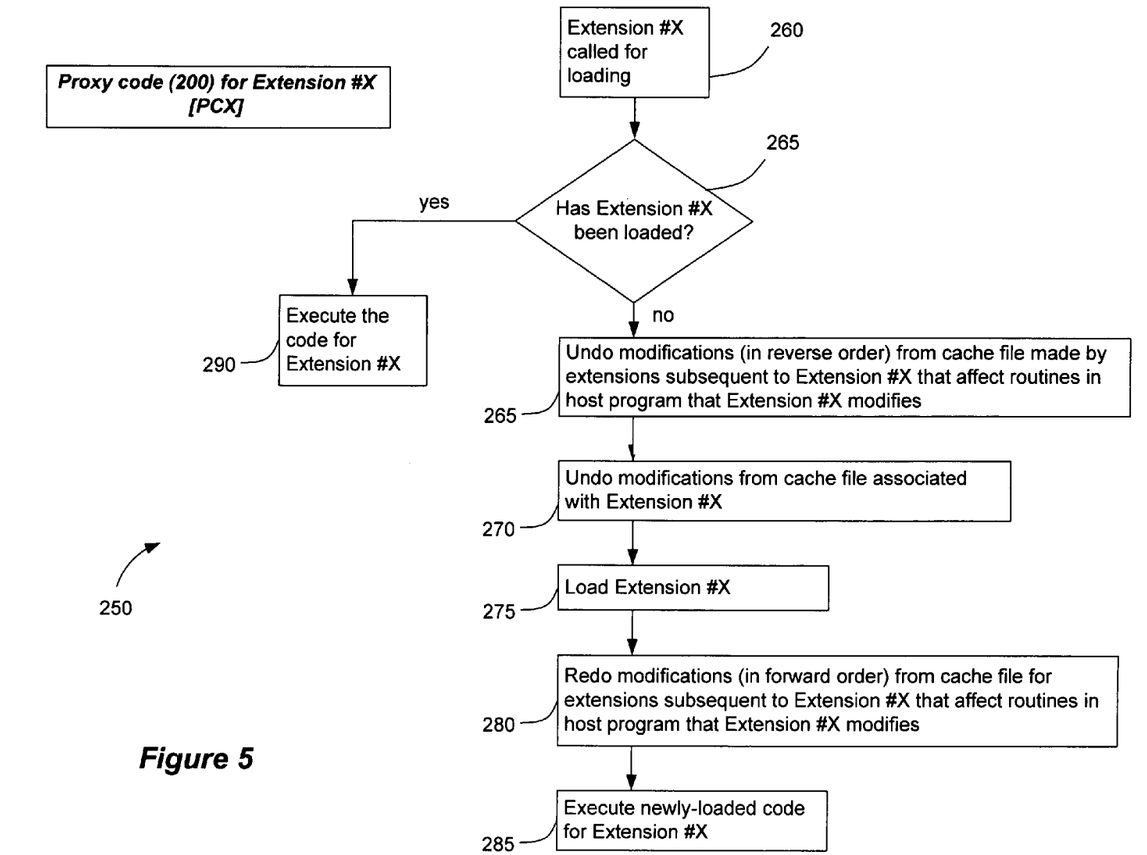
FIG. 5 illustrates an exemplary procedure to be performed by the proxy code that is generated from the cache file for each extension.

A functional description 250 of the proxy code 200 for a given extension, and how such code handles an eventual call for loading of the extension, is shown in the flow chart of FIG. 5. (Again, the proxy code 200 is preferably generated during loading of the cache file). As a first step, after a called extension (e.g., extension #X) is called for loading (260), it is determined whether that extension had been previously loaded (265). If so, there is no need to re-load the extension, and instead the code provided by extension #X is merely executed (290).

However, if this is the first time Extension #X is being loaded during a session of the host program, all modifications which the cache file 150 performed subsequent to Extension #X are undone in reverse order (265) (i.e., "rolled back"). Then, the modifications the cache file performed for Extension #X are removed (270), and then Extension #X is fully loaded (275). Then, the cache file is again read, and extensions subsequent to Extension #X are redone (i.e. "rolled forward") to once again pseudo-load them (280). Thereafter, the newly loaded Extension #X's code can be executed (285). While the specific coding for the proxy code 200 can and will vary between platforms and operating systems, one skilled in the art will appreciate that all of the information needed to generate the proxy code is determinable from the cache file 150 itself, as the cache file contains the ordering of the extensions (as reflected by their rows) and the necessary associations with the actual extensions themselves and the routines in the host program that the extensions affect.

Steps 265 and 280 can be thought of as a roll-back/roll-forward procedure, and is designed to preserve the ordering that the extensions would exhibit were they allowed to load as normal. Essentially, these steps seek to keep the extensions from conflicting with one another. For example, as noted in FIG. 4, three extensions seek to modify the host program's random number generator routine (Extension #1, 5, and 32). Suppose Extension #5 is called for loading, perhaps because the export service feature has been called. Absent any further consideration, such loading of Extension #5 would potentially "trump" (i.e., overwrite) the random number generator routine for Extension #32, which otherwise would have taken precedence over Extension #5 had the extensions been allowed to load in their normal order.

Accordingly, the roll-back/roll-forward procedure, in a simple embodiment, would start with the last extension (say Extension #50), and undo the cache file modifications. Thus, if Extension #50 had for example caused a button to be displayed, that button would be removed. This un-doing procedure is then rolled back to the second-to-last extension (#49), then #48, #47, etc. (265) until the selected extension (#5) itself is undone (270). Extension #5 is then loaded as it was called (275), and its proxy code is updated or removed (more on this later). Then, the cache file 150 is re-read and rolled forward (280) to re-execute the extensions from that point forward. Thus, the cache file 150 for Extension #6 is again performed, then Extension #7, and so on until the cache file is read through to its end (#50). Using this technique, it is assured that loading of a particular extension will not affect other extensions that have been loaded, and that the extensions will react predictably and in order as desired.

However, it may not be strictly necessary to undo/redo certain extensions and/or all aspects of those extensions. For example, the cache file, through its association to the routines in the host program to be effected (FIG. 4, column B) can identify potential conflicts to further streamline the roll-back/roll-forward procedure. For example, assume again that Extension #5 called for loading. Prior to the roll back (265), the host program can assess the routines that are affected in the host computer (column B), which reveals that only Extension #32 also seeks to affect the random number generator routine of the host program. In this case, only Extension #32 need be rolled back (265), followed by a roll back of Extension #5 (270), then Extension #5 can be fully loaded (275), and Extension #32 rolled forward (280). In a still further improvement, potentially affected extensions need not rolled back and forward in their entirety. For example, Extension #32 also affects the spell checker, but this has no relationship to Extension #5. Thus, only the random number generator function of Extension #32 need be rolled back (265), then Extension #5 is rolled back and loaded (270, 275), and then the random number generator portion of Extension #32 is rolled forward (280).

It is generally preferred that such undoing and redoing of the cache file 150 be generally transparent to the user. Accordingly, it is preferred to "freeze" the graphical user interface while the roll-back/roll-forward is accomplished, so that the user will not see (for example) buttons popping off and on the graphical user interface. One skilled in the art well knows how to freeze the screen in a typical computer, which will vary between operating systems.

Through the use of the preferred embodiment of the proxy code 200, as shown in FIG. 5, roll back (265) and roll forward (280) may not be required for all extensions that are called for loading. For example, suppose the host program is initialized, and the user selects the newly-added button on the toolbar for the equation editor as provided by Extension #16. Because no other extension bears any relation to the functionality of this extension (as noted via a review of column B), roll back (265) and roll forward (280) can be skipped in its entirety when that extension is loaded.

Figure 6:
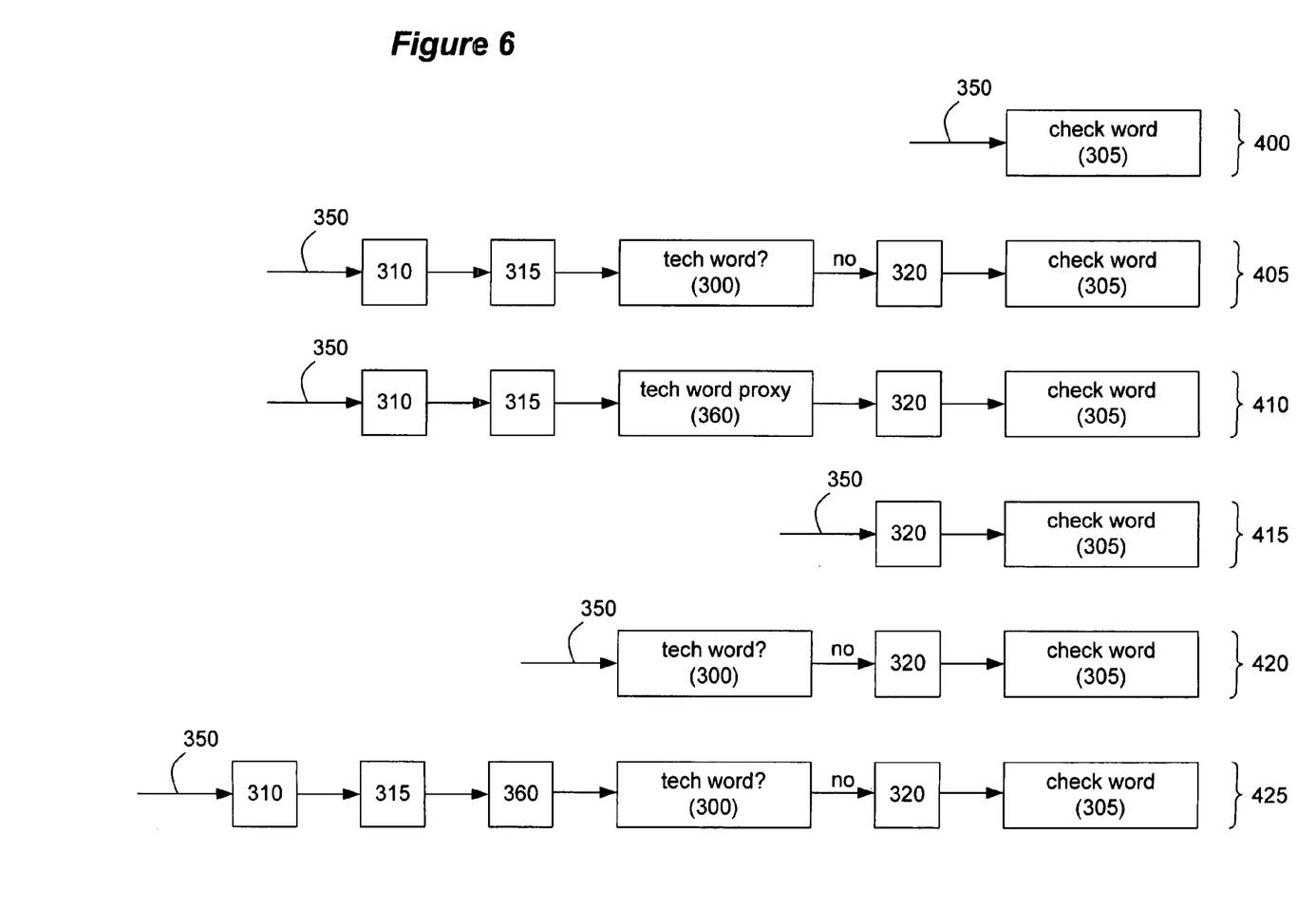
FIG. 6 illustrates modifications to a call chain to a host program procedure caused by recording, calling, and eventually loading an extension.

FIG. 6 illustrates an exemplary manner in which the proxy code 200 is generated and operates in an actual implementation. In this simple example, the extension 300 comprises a modification to the host program's spell checking routine 305 to add the additional functionality to spell check technical terms, i.e., to add a technical dictionary. The call chain to the host routine 305 absent the extension (400) comprises a pointer 350 to the host routine 305. When the extension 300 is loaded (405) upon initialization of host program (and assuming no previous caching), the pointer 350 in the call chain points to it. As shown, other routines (or extensions) (310, 315, 320) can be present in the call chain to the host spell checking routine 305. When the host program is subsequently initialized, the cache file 150 is read, and the proxy code 360 for the extension is inserted into the call chain in lieu of the loaded extension 300 (410). When the spell checking feature (and hence, the tech words extension 300) is eventually called during a session of the host program (415), the proxy code 360, which would no longer be required in this simple example, is removed from the call chain. Then the extension 300 is loaded and inserted back at the beginning of the call chain (420). Thereafter, the proxy code (360) reestablishes the complete call chain so as to allow the now-loaded extension 305 to be directly called (425) upon subsequent calls, without the need for re-loading.

An issue to contend with using the disclosed technique is the scenario in which a particular extension is loaded, but later another extension affecting that loaded extension's functionality is selected for loading. For example, and referring again to FIG. 4, suppose Extension #5 has been loaded by virtue of an earlier selection of the random number generator functionality that extension provides. As a result, the proxy code for extension #5 may have been removed (see, e.g., FIG. 6, 415). Assume later that Extension #1 is called for loading, which also modifies the host program's random number generator routine. During roll back, an absent other considerations, the proxy code for Extension #5 would be undone, as would the proxy code for Extension #1, then Extension #1 is loaded. However, in this case, it might not be possible or advisable to remove the proxy code for Extension #5, because it would be preferable to keep the proxy code 200 in tact for roll-back/roll-forward. Accordingly, in this case, the proxy code for Extension #5 would preferably not be removed upon loading the extension, but instead would change to become a call to the extension's code. This way the proxy code is still available for roll-back/roll-forward. Then, during roll forward, the proxy code for Extension #5 can be restored, in essence hiding the existence of Extension #5 from Extension #1 to keep the host program from being confused.

Yet another issue to consider is the circumstance in which an extension is called for loading, which in turn requires another extension to be loaded. For example, suppose the user selects the equation button of Extension #16, but Extension #16 requires the "support service" of Extension #5 to provide the functionality. Thus, loading Extension #16 may also load Extension #5. The recursive loading of Extension #5 during the load of Extension #16 behaves in a similar manner to non-recursive loading of Extension #5. Such recursive loading of the extensions obviates the need to cache dependencies between the extensions.

When a session of the host program terminates (e.g., is exited), the cache file 150 is preferably stored without modification and reloaded the next time the host program is initialized. However, the cache table 150 could be modified in other embodiments. For example, by reviewing and tracking the history or frequency with which various extensions were loaded, the host application might infer that certain extensions are desirable to the user, and may modify the cache file 150 to automatically load those extensions upon subsequent initializations of the host program. Alternatively, the user might be provided an option to "turn on" such frequently desired extensions to ensure that they load upon each initialization of the host program. Either way, host initialization would be lengthened as those previously selected extensions are loaded, but this may be preferable to a user who might prefer such frequently-used extensions to not have to load during the middle of a given session.

Newly registered extensions and deleted unregistered extensions are easily addressed with the disclosed technique. When the host program is initialized, the computer first checks the contents of the registry directory and the cache file 150 (i.e., column A, FIG. 4) to see which extensions are present in both. If a new extension is determined to be present in the registry directory, it is determined in which order that extension would load without the use of the disclosed technique. (One skilled in the art will recognize that many different ways exist to allow the host program to order the loading of the extensions). After this, the cache file 150 is executed up to the point in the cache where the new extension would intervene. The new extension is then loaded and recorded as explained above, and such information is stored as a new "row" in the cache file 150. Thereafter, the cache file 150 continues its execution where it left off. It can be recognized that the first initialization of the host program involves a special case for the adding of new extensions, in the sense that all extensions will be recognized as new and cached accordingly. By contrast, should it be determined that an extension has deregistered itself from the host program (i.e., because it is no longer present in the registry directory), that "row" in the cache file 150 can be deleted and/or skipped during its execution.

Certain extensions may logically need to be fully loaded instead of being cached. For example, an extension providing a stock ticker displaying stock prices would naturally need to be fully loaded and executed so it could start displaying accurate stock price data. In this and similar circumstances, the caching aspects disclosed herein could be subverted by allowing the extension to request the host program to load it each and every time the host program is initialized without caching. Such a request can come in the form of a key, command, or other specified format. However, while it may be useful to allow some extensions to exempt themselves from being cached, most extensions would not need such treatment, or would find caching non-problematic.

In other useful embodiments, the cache file/proxy code need not be generated by the host program, and need not be recorded upon loading of the extensions. Instead, the cache file/proxy code could be created independently by a program other than the host program, and by means other than recording. In short, in one embodiment, the technique merely envisions that the cache file with the necessary data and/or the proxy code be provided to the host program in some manner.

It should be clear from this disclosure that "changes" to the host program denotes not merely changes visible to the user (such as graphical user interface changes provided by a bit map), but also redirection of the host program (e.g., by using a pointer to either the registry directory or the extensions as they exist on the hard disk).

The cache file 150 need not in all useful embodiments be generated by or recorded by the host program. For example, the cache file could be manually generated even prior to the initialization of the host program, and independently of the host program. Such an alternatively-generated cache file would be particularly useful in embodiments in which it would not be desirable to read the cache file even upon the first initialization of the host program and without the need to first record loading of the extensions. The cache file need not be a single unitary file (although this is preferable), but could comprise files or other data structures related or linked to provide the desired functionality of the host program to pseudo-load all extensions registered to it. For example, several registries of extensions could be stored as several cache files and each cache file used in turn to pseudo-load each registry of extensions 150. The "cache file" or "file" as used herein should be so understood, and should be understood as potentially comprising multiple files or data structures, even if referred to in the singular.

While it is contemplated that the extensions of interest are "registered" with the host program, it should be understood that such registration does not require use of any formal mechanism, such as inclusion of the extensions in a registry directory as disclosed earlier. Thus, extensions can be "registered" with the host program in any number of ways that otherwise associate the extensions with the host program.

The foregoing methods and other functional aspects are easily programmable, and such programming would be a routine matter to a computer programmer of skill using any of a variety of different programming languages in the context of many different operating systems. Of course, the methods would be ultimately coded and stored on a computer-readable media, such as a compact disk, a tape, stored in a volatile or non-volatile memory, etc. While disclosed in the context of a traditional computer, it should be understood that the disclosed methods are not so limited. For example, the disclosed methods can have applicability with respect to other devices such as handheld devices (Personal Data Assistants, cell phones, etc.) and other multimedia devices (such as televisions, etc.).

The cache file 150 need not necessarily reside at the same location as the host program. For example, the cache file 150 could reside on a server coupled to a user's or users' computer (s) running the host program, and made available to each user when they initialize the local version(s) of the host program. Additionally, portions of the cache file 150 could reside on different computers or servers, i.e., the cache file 150 need not be a contiguous data file. Of course, each user could have their own cache files 150 for a given host program, with certain portions potentially sharable with other users also having access to the host program at different computers. Thus, the cache file used by one user can be generated in whole or in part by another user.

It should be understood that the inventive concepts disclosed herein are capable of many modifications. To the extent such modifications fall within the scope of the appended claims and their equivalents, they are intended to be covered by this patent.

What is claimed is:

1. A computer-implemented method, comprising:
   initializing a host program on a computer system, wherein the host program has an extension registered thereto for modifying, replacing, or adding to the functionality of the host program, the extension comprising executable code for implementing the functionality and at least one change to the host program usable for accessing the functionality;
   fully loading the extension, said fully loading including loading the executable code and making the at least one change to the host program;
   the host program monitoring said fully loading the extension to automatically detect the at least one change made to the host program during said fully loading the extension;
   in response to said detecting the at least one change, generating data indicating the detected at least one change, wherein the data indicating the at least one change made to the host program associates each change with the extension that made the change;
   upon a subsequent initialization of the host program, in lieu of loading the extension, modifying the host program to make the at least one change according to the generated data;
   after the subsequent initialization, selecting an aspect of the host program associated with the at least one change; and
   in response to said selecting, loading at least part of the extension corresponding to the at least one change.

2. The computer-implemented method of claim 1, further comprising the host program storing the generated data in a file, wherein the stored file is not stored with or otherwise associated with a particular extension.

3. The computer-implemented method of claim 1, wherein at least one change represents a graphical change to a graphical user interface of the host program.

4. The computer-implemented method of claim 3, wherein the generated data indicating the at least one change made to the host program comprises data indicative of the graphical change.

5. The computer-implemented method of claim 4, wherein said modifying the host program to make the at least one change comprises modifying the graphical user interface of the host program according to the data indicative of the graphical change.

6. The computer-implemented method of claim 1, wherein at least one change represents a non-graphical change to the host program.

7. The computer-implemented method of claim 6, wherein the data indicating the at least one change made to the host program comprises data indicative of the non-graphical change, wherein the data comprises a pointer to a location of the executable code.

8. The computer-implemented method of claim 1, wherein the extensions are registered to the host program through inclusion of the extensions in a registry directory of the host program.

9. The computer-implemented method of claim 1, wherein said selecting an aspect of the host program associated with the at least one change comprises receiving input selecting a user interface element displayed on a graphical user interface of the host program, the method further comprising, in response to said selection, modifying the graphical user interface of the host program as indicated by the generated data indicating the particular change.

10. A computer accessible memory medium which stores a file generated by a host program, wherein the host program has a plurality of extensions registered thereto for modifying, replacing, or adding to the functionality of the host program, wherein each extension comprises executable code for implementing the functionality and is configured to make at least one change to the host program as part of being loaded by the host application wherein the at least one change enables the host application to access the functionality, wherein the file comprises information indicating the at least one change made to the host program by each of the plurality of extensions during a previous loading of the extension, the information having been recorded in the file by the host application in response to having observed the at least one change having been made to the host program by the process of loading the extension during the previous loading, wherein the information indicating the at least one change made to the host program associates each change with the extension that made the change, wherein the previous loading of the extension comprised making the at least one change and loading the executable code for the extension, and wherein the file is configured to be read by the host program during initialization of the host program to make the changes to the host program indicated in the file in lieu of performing a loading the extensions, and wherein the file is further configured to be read by the host program after the initialization in response to a selection of an aspect of the host program associated with the at least one change to determine at least part of the extension to load that corresponds to the at least one change.

11. The memory medium of claim 10, wherein the file is generated upon a first initialization of the host program, wherein the plurality of extensions are loaded upon the first initialization.

12. The memory medium of claim 11, wherein the changes to the host program are recorded by the host program to the file upon the first initialization of the host program as the changes are made by the extensions.

13. The memory medium of claim 10, wherein the file is not stored with or otherwise associated with a particular extension.

14. The memory medium of claim 10, wherein at least one change represents a graphical change to a graphical user interface of the host program.

15. The memory medium of claim 14, wherein the information indicating the changes made to the host program comprises data indicative of the graphical change.

16. The memory medium of claim 10, wherein at least one change represents a non-graphical change to the host program.

17. The memory medium of claim 16, wherein the information indicating the at least one change made to the host program comprises data indicative of the non-graphical change, wherein the data comprise a pointer to a location of the executable code for an extension associated with the non-graphical change.

18. The memory medium of claim 10, wherein the extensions are registered to the host program through inclusion of the extensions in a registry directory of the host program.

19. The memory medium of claim 10, wherein the file includes an indication of an order in which the extensions would load.

20. The memory medium of claim 10, wherein the information indicating the at least one change made to the host program by each of the plurality of extensions associates each change with a respective extension.

21. The memory medium of claim 20, wherein each extension is represented in the file by a pointer to a location of the extension.

22. The memory medium of claim 21, wherein the information indicating the at least one change made to the host program by each of the plurality of extensions associates at least one change with at least one routine in the host program that the respective extension would modify, replace, or add to.

23. A computer-readable memory medium storing program instructions, wherein the program instructions are computer-executable to implement:
   initializing a host program on a computer system, wherein the host program has an extension registered thereto for modifying, replacing, or adding to the functionality of the host program, the extension comprising executable code for implementing the functionality and at least one change to the host program usable for accessing the functionality;
   fully loading the extension, said fully loading including loading the executable code and making the at least one change to the host program;
   the host program monitoring said fully loading the extension to automatically detect the at least one change made to the host program during said fully loading the extension;
   in response to said detecting the at least one change, generating data indicating the detected at least one change, wherein the data indicating the at least one change made to the host program associates each change with the extension that made the change;
   upon a subsequent initialization of the host program, in lieu of loading the extension, modifying the host program to make the at least one change according to the generated data;
   after the subsequent initialization, selecting an aspect of the host program associated with the at least one change; and
   in response to said selecting, loading at least part of the extension corresponding to the at least one change.

24. The computer-readable memory medium of claim 23, wherein at least one change represents a graphical change to a graphical user interface of the host program.

25. The computer-readable memory medium of claim 23, wherein at least one change represents a non-graphical change to the host program.

26. The computer-readable memory medium of claim 23, wherein, wherein in said selecting an aspect of the host program associated with the at least one change, the program instructions are computer-executable to implement receiving input selecting a user interface element displayed on a graphical user interface of the host program, wherein the program instructions are computer-executable to implement, in response to said selection, modifying the graphical user interface of the host program as indicated by the generated data indicating the particular change.

27. The computer-readable memory medium of claim 23, wherein the generated data indicating the changes indicates at least one change represented in the file as bit map data indicative of the change.

* * * * *